United States Patent [19]

Lauer

[11] 3,739,063

[45] June 12, 1973

[54] SHOCK WAVE REACTIONS
[75] Inventor: James L. Lauer, Penn Wynne, Pa.
[73] Assignee: Sun Research and Development Co., Philadelphia, Pa.
[22] Filed: Dec. 29, 1970
[21] Appl. No.: 102,521

Related U.S. Application Data

[63] Continuation-in-part of Ser. No. 795,926, Feb. 3, 1969, abandoned.

[52] U.S. Cl. ............... 423/648, 423/579, 423/659, 423/415, 423/443, 260/679
[51] Int. Cl. ........................ C01b 1/03, C01b 13/02
[58] Field of Search ................. 23/1 R, 1 B, 210 R, 23/212 R, 221, 202 V; 423/579, 659, 648, 657, 415, 443

[56] References Cited
UNITED STATES PATENTS

| | | | |
|---|---|---|---|
| 2,582,885 | 1/1952 | Rosenblatt | 23/221 X |
| 2,902,337 | 9/1959 | Glick et al. | 23/1 R |
| 3,251,648 | 5/1966 | Alexander et al. | 23/1 R X |
| 3,300,283 | 1/1967 | Lauer | 23/284 |
| 3,307,917 | 3/1967 | Hansel et al. | 23/1 R X |
| 3,406,014 | 10/1968 | Guerrieri | 23/221 |

*Primary Examiner*—Edward Stern
*Attorney*—George L. Church, Donald R. Johnson, John F. McNally et al.

[57] ABSTRACT

It has been found that the efficiency of shock wave reactions can be greatly improved by using mercury vapor as a diluent in the reaction gas. By using reduced pressure in the reaction gas - Hg mixture the boiling point of the Hg is reduced and after the reaction the Hg is easily separated merely by allowing the product gas to come to atmospheric pressure whereupon the Hg condenses out. Even at pressures of atmospheric or greater the Hg is easily separated from the product gas because of its high boiling point.

3 Claims, 11 Drawing Figures

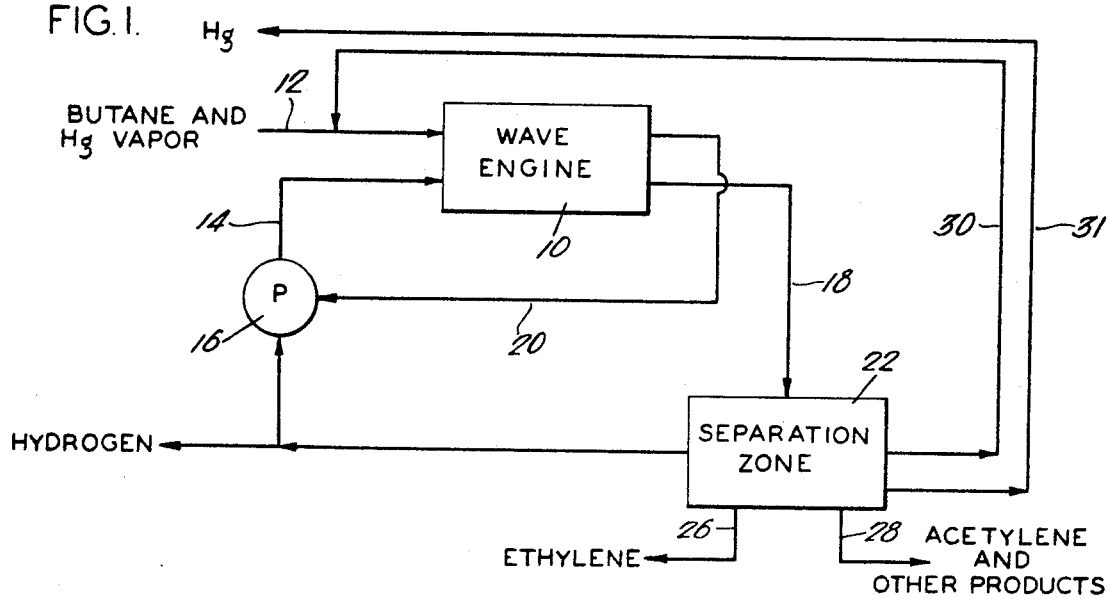
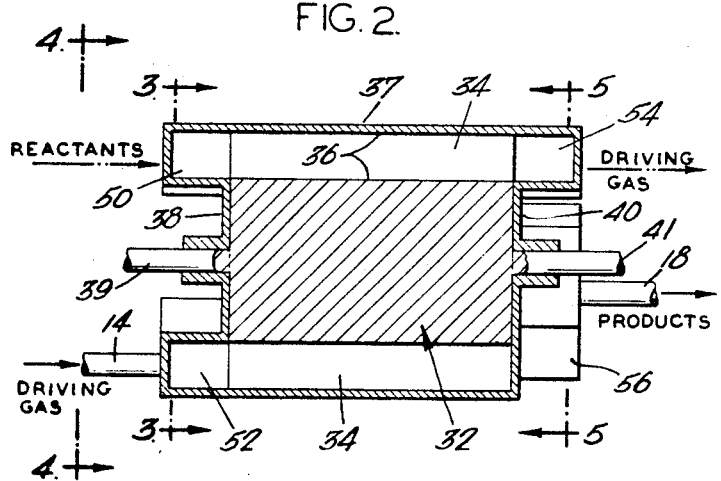
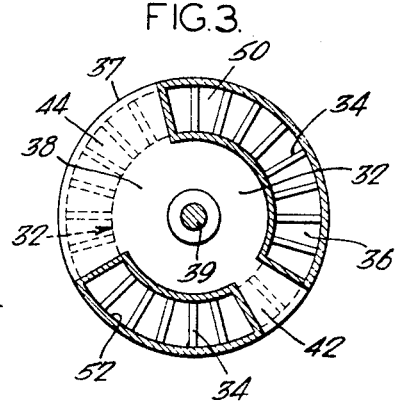
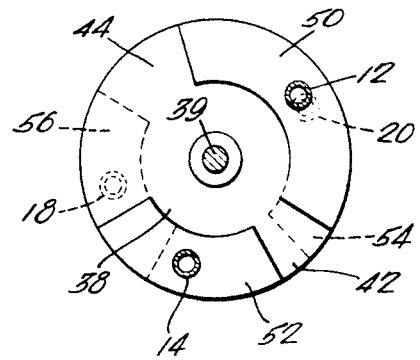
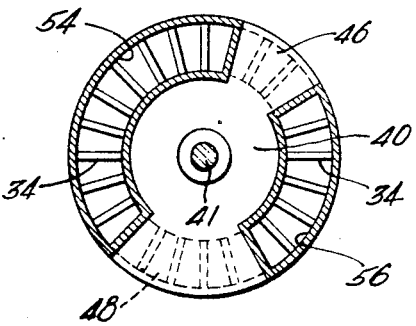

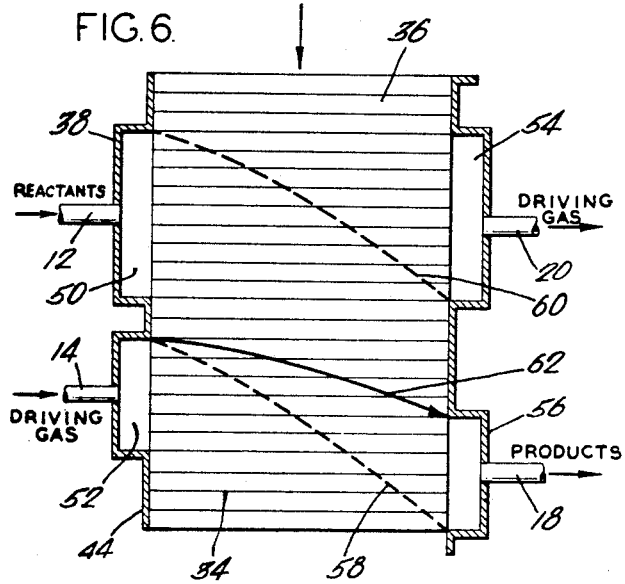
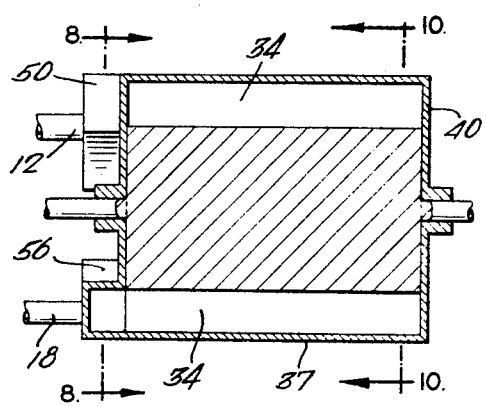
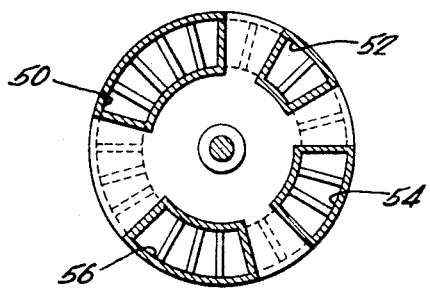
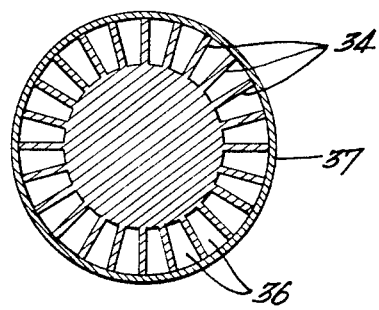
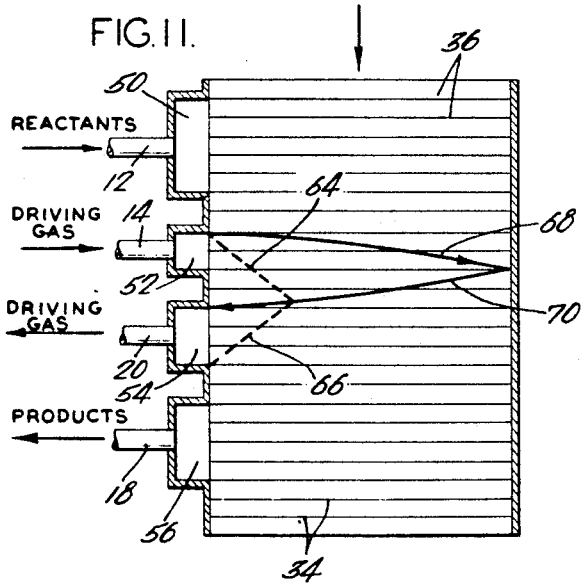
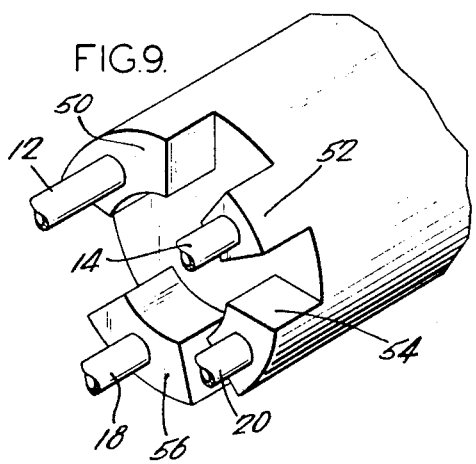
INVENTOR:
JAMES L. LAUER
BY Kenneth H. Johnson
ATTY.

SHOCK WAVE REACTIONS

CROSS REFERENCE TO RELATED APPLICATION

This application is a continuation-in-part of application Ser. No. 795,926 filed Feb. 3, 1969, now abandoned.

The present invention relates to an improvement in endothermic chemical reactions carried out by subjecting a reactant material to one or more mechanical shock waves, thereby to produce a high temperature in such material for a very short period of time. More particularly the invention relates to the use of mercury vapor as a diluent in the reaction gas.

In various chemical reactions, it is necessary that very high temperatures be employed and that the residence time of the reactants at the elevated temperature be very short. Nitrogen fixation is well adapted to this type of reaction. It can, for example, be used for the manufacture of nitric oxide from its elements in accordance with the reaction:

$$O_2 + N_2 \rightleftharpoons 2NO$$

or from $CO_2$ in accordance with the equation:

$$N_2 + 2 CO_2 \rightleftharpoons 2NO + 2 CO$$

as well as for the production of acetylene and hydrogen cyanide from a hydrocarbon as exemplified by the following chemical equations:

$$2CH_4 \rightleftharpoons C_2H_2 + 3H_2$$

and $$2CH_4 + N_2 \rightleftharpoons 2HCN + 3H_2$$

For these equations, which may in effect be thought of as a single reaction, to proceed, it is necessary that very rapid heating of the reactants from a temperature not greater than 500°C. to a temperature not less than 1,760°C. be accomplished. The maintenance of the reactants too long at temperatures in the range of 500° to 1,760°C. results in excessive reaction, producing undesired products such as carbon.

It is therefore necessary that the heating through this crucial range be extremely rapid. It is also necessary that upon reaching the reaction temperature, which is for example in the range of 1,760° to 2,250°C., the reactants be maintained at such temperature for only a short time. It is further necessary that the reaction products be rapidly cooled from the reaction temperature to a temperature not substantially greater than 880°C.

Shock wave procedures have been found to be particularly advantageous in the type of reaction described above. This is accomplished by subjecting the reactants to one or more mechanical shock waves thereby to produce a high temperature and pressure in the reactant material for a very short period of time. In fact the distinguishing characteristic of shock wave reactions is the large and discontinuous rise in temperature and pressure caused when the shock wave passes through the reaction mixture.

Other reactions that are of the type suitable for shock wave processing include such reactions as the cracking of butane to ethylene, thermal dissociation of water vapor to hydrogen and oxygen (providing hydrogen from an abundant raw material), dissociation of carbon dioxide into carbon monoxide, the formation of acetylene from methane, ethane or ethylene, the formation of carbon disulfide from carbonaceous, hydrogenous and sulfur containing material, the formation of methanol and formaldehyde from methane and oxygen and many others.

The required heating and cooling may be conveniently effected in a shock tube. A shock tube is a pipe in which a gas or a gas mixture (termed the process gas) can be heated very rapidly to very high temperature by another gas, the driving gas, non-isentropic compression being the heating mechanism. That is to say, the process involves compression of the process gas by another gas, the driving gas, which latter works in a way similar to a mechanical piston. The compression is the result of a shock wave produced in the tube.

The heating is followed almost immediately by rapid cooling through expansion. If there is a frequency of equivalent independent shock tube processes, the result is essentially a continuous flow process.

The gas or mixture of gases which is acted upon in the shock tube may be termed the reagents, a process gas, a reactant mixture, a charge gas, a reactant material, or a process mixture.

It is in many cases advantageous to add an inert gas to the reaction gas, so as to increase the value of ratio $k$ of the mixture to be reacted and subsequently, to obtain a higher temperature in the reactor at a given pressure. The constant $k$ as used herein is the ratio of $Cp$ (the specific heat of the gas at constant pressure) to $Cv$ (the specific heat of the gas at constant volume). Thus in order to obtain the most favorable temperature/pressure relationship it is often desirable to mix the gas or gas mixture which is to react, with an auxiliary carrier gas having a higher $k$ value than the first mentioned gas or gas mixture. This use of a carrier gas with a suitable $k$ value is particularly important when hydrocarbons are to be reacted, e.g., cracked, in view of the low $k$ values of hydrocarbons and particularly of the heavier hydrocarbons. In the past it has been the practice to employ a gas such as steam, nitrogen, helium, neon, or argon as the carrier. Preferably the carrier gas has been inert in the reaction but not necessarily so. For example in a reaction using a magnetically driven shock wave to produce acetylene from methane ($k = 1.30$) the reaction gas is diluted with nitrogen ($k = 1.40$) which is reactive to produce hydrogen cyanide, but by adjusting the mole ratios of methane and nitrogen better yields of acetylene can be obtained than in the absence of a diluent as shown in Table I.

TABLE I

| Run No | 1 | 2 | 3 | 4 | 5 | 6 |
|---|---|---|---|---|---|---|
| Original Pressure in Reactor (mm. Hg) | 22.4 | 23.0 | 22.3 | 24.4 | 23.1 | 23 |
| Energy input (Watt-hrs.) | 1.07 | 1.96 | 1.83 | 1.76 | 1.61 | 1.74 |
| Mol percent $N_2$ in charge | 79.9 | 65.7 | 55.2 | 58.2 | 37.2 | 0 |
| Mol percent $CH_4$ in charge | 20.1 | 34.3 | 44.8 | 41.8 | 62.8 | 100 |
| Yield (Mol percent) based on $CH_4$ in charge: | | | | | | |
| HCN | 16.9 | 22.5 | 16.6 | 17.1 | 4.6 | 0 |
| Acetylene | 31.2 | 54.6 | 61.2 | 54.9 | 47.4 | 0 |

In addition to a particular diluent gas having a favorable $k$ a high molecular weight gas is preferable since the strength of the shock wave is a function among other things of the molecular weight of the reactant gas. An extensive discussion of the theory and application of shock waves in this regard can be found in *Shock Waves in Chemistry and Physics*, John N. Bradley, 1962, Great Britain, Bulter & Lanner, Ltd., particularly Chapters II and III, pages 13–109.

Of the carrier gases previously employed argon is usually used as diluent in shock tubes because it is inert, has the highest possible $k$ (1.67) and has a reasonably high molecular weight, i.e., 40. Unfortunately argon is expensive and would make the economics of a continuous shock wave process unattractive. Furthermore, argon is not easily separated from the products of shock wave reactions.

The present invention provides a novel diluent that has a high $k$ constant, high molecular weight, and is easily separated from other materials. Briefly the present invention is an improvement in the process of subjecting a gaseous reactant material to one or more mechanical shock waves wherein the improvement comprises adding a mercury vapor diluent into said gaseous reactant. Mercury vapor has a $k$ of 1.67, a molecular weight of 200.59 which is over five times that of argon, and is separable from other gases by condensation.

The obvious disadvantage of mercury vapor is of course the boiling point of mercury (357°C). This problem is readily overcome when the practical operation of any shock wave process is considered. In actual operation preheating of reactant gases is employed for the achievement of adequate reaction temperature for high yields. For example, in my U.S. Pat. No. 3,231,482, it is stated that in the preparation of carbon disulfide from methane and $H_2S$ the reactant gases should be preheated to 125° to 425°C. Usually it has been the preferred procedure to introduce the reactants at one atmosphere or lower pressure; lower pressures are advantageous in that they facilitate the provision of a high ratio of driving gas pressure to reactant gas pressure, and such ratios favor the obtaining of high temperatures as a result of the shock wave. Other initial temperatures and pressures can be employed if desired, although initial temperatures above 425°C. should be avoided in order not to obtain premature and excessive reaction especially with organic compounds prior to subjection to the shock wave. With more thermodynamically stable compounds, for example, water, higher temperature may be tolerated. The use of lower pressures will reduce the boiling point of mercury and significantly simplify the separation of Hg vapor from the product gases. This is achieved merely by allowing the pressure of the product gases to come to atmospheric, since the shock wave technique (discussed below in more detail) can result in the temperature of the product gases being of the same order of magnitude as the reactant gases, the temperature of the Hg vapor will be below its boiling point at atmospheric pressure and will immediately condense. In any event the Hg is easily separated from the other product gases merely by cooling the gases to below mercury's boiling point corresponding to its partial pressures, at this temperature most other components of the product gas will still be vaporous.

The mercury vapor is added to the reactant gases prior to feeding them to the reaction zone at a volume ratio of reaction gas to Hg vapor in the range of 1:2 to 1:200.

Prior to the first shock wave, the reactant gases, including the Hg vapor are held preferably at a temperature in the range of 125° to 425°C. and at a pressure in the range of from 0.1 to 10.0 atmospheric, the temperature and pressure being adjusted to provide conditions under which the mercury is in a vaporous state.

The invention will be further described with reference to the attached drawings wherein FIG. 1 is a schematic flow diagram of a process system for the preparation of ethylene from butane, the system including a wave engine for producing the mechanical shock wave.

FIG. 2 is a sectional elevation of the wave engine,

FIG. 3 is a sectional left-hand end view on the line 3—3 of FIG. 2,

FIG. 4 is a left-hand view of FIG. 2,

FIG. 5 is a sectional right-hand view on the line 5—5 of FIG. 2,

FIG. 6 is a development of the cylindrical wave engine of FIG. 2 and illustrates the paths of gas flow through the wave engine, and FIGS. 7 to 11 are views of a second embodiment of the wave engine, the views corresponding to those of FIGS. 2 to 6, respectively, except that FIG. 9 is an isometric drawing, whereas the corresponding FIG. 4 is not.

Referring to FIG. 1, butane and Hg vapor are introduced through line 12 into wave engine 10. Hydrogen at elevated pressure is introduced through line 14 into wave engine 10 and subjects the previously introduced butane and Hg vapor to a shock wave in a manner which is subsequently described more fully. The butane is thereby heated to reaction temperature and cracks to form ethylene with acetylene as by-product. The reaction products, together with unreacted butane and Hg vapor, are removed from the wave engine through the line 18. Hydrogen is removed separately from the wave engine through the line 20.

The reaction products and unreacted material are introduced into a separation zone 22 wherein a plurality of operations are carried out to obtain the respective constituents in purified form. Hydrogen, which was formed in the reaction is separated by known means such as diffusion through a palladium tube and is removed through a line labeled "Hydrogen". A portion of this hydrogen is introduced into compressor 16 for subsequent use in another cycle of the wave engine operation. The remainder of the product hydrogen is withdrawn as a product of the process.

Ethylene is separated from the remaining gases by cooling. All gases may, of course, be separated by diffusion or other standard procedures. Acetylene is subsequently separated from the remaining gases by absorption in a copper salt solution or by other known means for recovering acetylene from gaseous mixtures. The remaining butane is recycled to the wave engine through line 30.

Mercury is separated by condensing and is passed through 31 to a vaporizer (not shown) for reuse. In the operation illustrated in FIG. 1, the hydrogen acts as a driving gas to cause a shock wave in the reactant material. This hydrogen is substantially unchanged as a result of passage through the wave engine, and is recycled through line 20 and the compressor 16. If the hydrogen withdrawn through line 20 contains substantial quantities of other gases in the system, it can be passed through the separating system 22 prior to recycle to the wave engine 10, though this is usually not necessary.

The wave reactors used in the process of this invention are well known in the art, for example wave reactors of the types shown and described in U.S. Pat. Nos. 2,832,666; 2,902,337; 3,254,960; 3,262,757 and 3,272,598.

Referring to FIGS. 2 to 6, the wave engine 10 is illustrated therein in more detail. The wave engine comprises a cylindrical rotor 32 to which are attached a plurality of longitudinal vanes 34. These vanes provide a series of channels or tubes 36 having open ends. The tubes are bounded inwardly by the rotor 32, outwardly by the stationary cylindrical shell 37 of the wave engine, and laterally by the vanes 34. The rotor and attached vanes are rotated by means of a motor not shown, and a shaft 39. The shaft 41 is seated in a bearing not shown.

The wave engine is closed at the ends by stationary end plates 38 and 40. Positioned outwardly from the end plates and adjacent to the ends of the tubes 36 are two stationary manifolds at each end of the wave engine. The manifolds 50 and 52 are positioned at the left-hand end, and the manifolds 54 and 56 at the right-hand end. Between manifolds 50 and 52, the wave engine is closed at the ends by extensions 42 and 44 of end plate 38, and between manifolds 54 and 56, by extensions 46 and 48 of end plate 40.

The operation of the wave engine can best be understood with reference to FIG. 6. The clockwise rotation of the rotor results in a motion of the tubes which in FIG. 6 is from top to bottom. The reactants are continuously introduced, for example at 1 atmosphere and 420° C., through line 12 into manifold 50, from which they enter the left ends of those tubes 36 which are in communication with the manifold 50. The reactants fill those parts of the tubes on the left side of the interface 60, which is indicated in FIG. 6 by a dashed line. On the left side of the interface are reactants, and on the right side hydrogen.

The driving gas, hydrogen, is continuously introduced, e.g., at 12 atmospheres and 420°C. through line 14 into the manifold 52, from which it is introduced into the left ends of the tubes which are in communication with that manifold. The hydrogen fills those parts of the tubes on the left side of the interface 58, the reactants now being on the right side of the interface 58. The reactants are subjected to a shock wave as a result of the sudden force of the high pressure driving gas entering the tubes. This shock wave, traveling at a velocity of about Mach 5, moves along a path indicated by the line 62 in FIG. 6. The shock wave travels faster than the interface between the driving gas and the reactants, the velocity of the interface 58 and of the interface 60 being about Mach 1. The shock wave therefore passes ahead of the interface 58 and travels through the reactant mixture. The latter is thereby shock-compressed to a pressure of about 8 atmospheres with resulting sudden rise in temperature to about 1,200°C. At this temperature conversion of reactants to products takes place. The products are expanded into manifold 56 and line 18, thereby rapidly cooling the reaction products and quenching the reaction. This rapid cooling provides a large increase in the yield of desired reaction products. The driving gas is withdrawn through manifold 54 and line 20.

The tubes are moving in a circular path, and therefore when a tube reaches the lower end of FIG. 6, it has returned to its original position, i.e., to the upper end of FIG. 6, and then begins a new cycle identical with the one previously described.

After the driving gas has been expanded from the tubes into the driving gas outlet manifold, the contents of the tubes are at a temperature of the same order of magnitude as that which prevailed prior to the creation of the shock wave. A gas to act as a scavenging or cooling agent can be then introduced into the tubes if it is desired either to further cool the contents of the tube or to remove residual driving gas from the tube or both.

The scavenging or cooling gas can be any gas which is nonreactive at the prevailing conditions. It may be constituent or constituents of the reactant materials or reaction products, since such constituents are generally non-reactive at the conditions prevailing after removal of the driving gas. Nitrogen is a preferred scavenging or cooling gas, but others such as hydrogen, methane, etc., can be employed.

If scavenging or cooling gas is used, such gas may be introduced into the tubes through an inlet manifold, not shown in FIGS. 2 to 6, located below inlet manifold 52 as shown in FIG. 6. The additional inlet manifold would therefore be positioned so that the left ends of the tubes come in communication with the additional manifold after coming into communication with the manifold 52 and before again coming into communication with manifold 50. A suitable outlet manifold, also not shown, would also be provided, to come into communication with the right ends of the tubes after the tubes have come in communication with manifold 54 and before again coming into communication with manifold 56.

Turning to FIGS. 7 to 11, operation is therein illustrated which involves the production of a reflected shock wave which results in the subjection of the reactants to two shock waves in rapid succession. Each shock wave produces a rapid heating of the reactants, and the use of reflected shock wave makes it possible to obtain higher temperatures than those which are obtained with a single shock wave such as that provided in the operation previously described.

In the apparatus shown in FIGS. 7 to 11, the outlets for the driving gas and reaction products are on the same side of the tubes as the inlets for the reactants and driving gas. The right ends of the tubes are closed by end plate 40 and gases therefore cannot be removed from the right side of the tubes.

Referring to FIG. 11, reactants are continuously introduced, for example at 1 atmosphere and 420° C., through line 12 and manifold 50 into the left ends of the tubes 36. At this time, the tubes contain a small amount of reaction products from a previous cycle, and the introduced reactants commingle with these products. Subsequently, the left ends of the tubes come in communication with manifold 52 through which the driving gas is introduced, for example at 12 atmospheres and 420°C. The driving gas fills those parts of the tubes which are on the left side of the interface 64.

As a result of the introduction of the driving gas, a shock wave 68 travels through the reactants to the far ends of the tubes, and this shock wave compresses the reactants to a pressure of about 8 atmospheres, thereby heating the gases to 1,200°C. On reaching the end plate 40, the shock wave is reflected toward the left ends of the tubes as a reflected shock wave 70, which further compresses the reactants and heats them to about 1,700°C. The wave 70 pushes the interface between reactants and driving gas toward the left ends of the tubes as the reflected interface 66.

Driving gas is withdrawn through manifold 54 and line 20, and reaction products are evacuated through manifold 56 and line 18, leaving a small amount of reaction products in the tubes for the next cycle, which begins with the introduction of fresh reactants through line 12 and manifold 50.

If desired, a cooling gas can be introduced into the tubes following the evacuation of the reaction products and before the introduction of fresh reactants. The principles involved in such introduction are generally similar to those described previously in connection with FIG. 6. The inlet and outlet manifolds for such introduction and removal of cooling gas are preferably located on the same side of the tubes as the other manifolds, though other arrangements can be used.

The use of a reflected shock wave, as illustrated in FIGS. 7 to 11, is preferred because of the higher temperatures which are thereby obtainable while still maintaining a very short residence time.

A reflected shock wave is produced in another embodiment in operation wherein driving gas is introduced simultaneously from opposite ends of a reaction tube containing reactant gas at lower pressure than the driving gas. Two shock waves travel inwardly through the reactant gas to the center of the tube, where they meet and are reflected from each other, to travel outwardly through the reactant gas again. The driving gas is then withdrawn from the tube; the reaction products are then withdrawn from the tube, which is then preferably scavenged prior to the introduction of additional reactant gas and the beginning of another cycle.

It is within the scope of the invention to provide any suitable number of shock waves during a single cycle. In one embodiment, more than two shocks can be provided. In this embodiment, instead of providing the manifold 20 as an outlet for the driving gas, the reflected shock wave 70 can be again reflected toward the right ends of the tubes as a third shock wave not shown, the driving gas and reactants being separately withdrawn from the right ends of the tubes through suitable means not shown. Alternatively, the shock wave can be reflected back again as a fourth wave, etc. However, from the standpoint of simplicity of design and other features, it is preferred to provide only two shocks in a cycle.

Two primary shocks may be applied to a reaction mixture by recycling the total effluent from the outlet or by passing the total effluent into a second wave engine.

In its general aspect, the invention involves introducing reactant gases and Hg vapors into a tube, introducing driving gas into the tube containing the reactants and Hg vapors, the latter introduction being from either end of the tube or from both ends simultaneously, in either event resulting in the subjection of the reactants to a shock wave, and then separately removing driving gas and reaction products from the tube in any suitable order. The reactants, Hg diluent, and the driving gas can be introduced at the same or opposite ends of the tubes, and the reaction products and effluent driving gas can be removed at the same or opposite ends of the tube. In the light of the present specification, a person skilled in the art can design a suitable apparatus for any desired arrangement. From the standpoint of practicability, the apparatus illustrated in the drawing is preferred, but other apparatus is within the scope of the invention.

Hydrogen is much preferred for use as the driving gas according to the invention, since its low density and high heat capacity ratio ($k$) make it particularly suitable for this use. Gases having low density and high heat capacity ratio are very effective in creating a shock wave and thereby generating high pressure and temperature in the reactant gases.

Although hydrogen is the preferred driving gas, it is within the scope of the invention to employ any other suitable gas, for example a constituent or constituents of the reaction mixture, or some other constituent or constituents of the product mixture, or some inert gas, e.g., helium.

In the process according to the invention, the reaction temperature which is attained as a result of the shock wave or waves is preferably in the range from 800° to 2,000°C., and more preferably at least 1,200°C. The residence time of reactants in the tubes is preferably in the range from 0.0001 to 1.00 second, and more preferably in the range from 0.01 to 0.1 second. With higher temperatures, it is generally desirable to use shorter residence times in order to avoid excessive decomposition of reactants.

The pressure obtained in the reactant gases as a result of the shock wave or waves is preferably in the range from 5 to 30 atmospheres and is usually in the range from 5 to 15 atmospheres. The temperature and pressure obtained as a result of the shock wave or waves are inherent effects of the initial temperature and pressure of the reactants and driving gas, and also of the respective natures of the reactants, the volume of Hg vapor and the driving gas, and are therefore subject to considerable variation.

The initial temperature of the driving gas as introduced into the tubes is preferably in the range from 125° to 425°C. The ratio of the initial driving gas pressure to the initial reactant pressure is preferably in the range from 5 to 50, and more preferably at least 10. Other temperatures and pressures can be employed in some instances, and it is even possible to employ a driving gas which is initially at room temperature and obtain significant heating as a result of the shock wave. However, in order to obtain a sufficiently high temperature for a practical process, it is generally necessary to preheat the driving gas and also the reactants.

In order to obtain a reaction temperature of 800°C. or higher, it is generally necessary to use hydrogen as driving gas, a pressure ratio (i.e., initial ratio of driving gas pressure to reactant pressure) of at least 5, an initial reactant temperature of at least 300°C., and a reflected shock wave. To obtain a reaction temperature of 1,500° C. or higher, with hydrogen and a reflected shock wave, pressure ratio of at least 20 and initial reactant temperatures of at least 400°C. will usually be needed.

The residence times of gases in the tubes and the through-puts of reactants and driving gas are functions of the design and operation of the apparatus. In the light of the present specification, a person skilled in the art can select proper design and operation in order to obtain desired residence times and through-puts for a given instance. As an example, in an apparatus containing 35 tubes, each 6 inches long, and having cross-sectional areas of 0.25 square inch, the apparatus being rotated at 8,000 r.p.m. to provide a residence time of 0.002 second, through-puts of 0.1 to 0.2 pound of gas per second may typically be obtained.

Preferably, the driving gas, the reactants and the products are gas phase materials at the temperature of introduction into the reaction tubes. Where elemental carbon is employed as a reactant, it may be introduced into the tubes as a suspension in nitrogenous gas. Gas phase, as the term is used herein, includes vapor phase.

The reaction according to the invention proceeds satisfactorily without a catalyst. However, a known catalyst can be employed if desired, e.g., as a coating on the insides of the tubes. The tubes themselves should be free of obstruction, in order that the shock wave may be satisfactorily propagated.

The following examples will further illustrate the present invention.

EXAMPLES 1-4

Cracking of Butane

The conditions and results of four runs made according to the procedure set out in describing the drawing are shown in Table II.

TABLE II

| Run | 1 | 2 | 3 | 4 |
|---|---|---|---|---|
| Reactant Gas | | | | |
| 1. butane vol % | 100 | 10 | 5 | 1 |
| 2. Hg vol % | 0 | 90 | 96 | 0 |
| 3. Argon vol % | 0 | 0 | 0 | 99 |
| 4. Pressure psia | 0.5 | 0.5 | 0.5 | 10(psig) |
| 5. Temp. °C | 400 | 400 | 400 | 25 |
| Driving Gas Hydrogen | | | | |
| 1. Pressure psia | 300 | 300 | 300 | 600(psig) |
| 2. Temp. °C | 400 | 400 | 400 | 25 |
| Products a | | | | |
| 1. ethylene vol % | 2 | 30 | 44 | 49.8 |
| 2. acetylene vol % | 1 | 5 | 9 | 4.7 |
| 3. butane vol % | | 65 | 47 | 7.0 |

*based on total hydrocarbons present in reactant gas*

The following examples were also conducted according to the procedure set out in describing the drawing. The analysis were made by standard spectroscopic means.

EXAMPLE 5

Dissociation of Water Vapor

The reactant gas mixture containing 1% $H_2O$ by volume in 99% Hg is held at a temperature of 600°C and at a pressure of 75 psia in a wave engine. The driving gas, hydrogen, is introduced into a separate chamber until a pressure of 750 psia is reached. The hydrogen is then released into the $H_2O$/Hg mixture and shock-compresses the reactant gas mixture to about 20 atmospheres with resulting temperature of about 3,300°C.

Reaction equilibrium is reached at these conditions during the residence time. The water vapor decomposes and a complete analysis of the product mixture by volume percent is:

| | |
|---|---|
| $H_2$ | 13.7 |
| $O_2$ | 4.3 |
| O | 2.3 |
| H | 4.7 |
| OH | 10.0 |
| $H_2O$ | 66.0 |

On expansion through an exit port or nozzle the hydrogen travels much ahead of the other gases and can, therefore, be separated. No oxides of mercury are formed as they are considerably less stable than water.

EXAMPLE 6

Dissociation of Carbon Dioxide

A charge gas of 1% $CO_2$ in 99% Hg by volume is introduced into the wave engine and pre-heated to 400°C at 2 atmospheres. Hydrogen at 20 atmospheres is released into the $CO_2$/Hg mixture and shock-compresses the charge gas to about 10 atmospheres with resulting temperatures of about 2,700°C. The carbon dioxide decomposes and upon separation and analysis of the product mixture by volume percent yields:

| | |
|---|---|
| $CO_2$ | 67.5 |
| CO | 22.2 |
| O | 10.3 |

EXAMPLE 7

Formation of Carbon Disulfide

A reactant mixture containing 1% $CH_4$, 1% $H_2S$ in 98% Hg by volume was put into the wave engine and pre-heated to 400°C. at 1 atmosphere. Hydrogen compressed to about 20 atmospheres is introduced into the gas mixture and shock-wave produced compresses the reactant mixture to about 8 atmospheres with a resulting temperature of about 1,700°C. The methane and hydrogen sulfide react to form carbon disulfide with acetylene and ethylene as by-products. Upon separation a complete analysis of the product by volume percent is:

| | |
|---|---|
| $CS_2$ | 20 |
| $CH_4$ | 30 |
| $C_2H_2$ | 40 |
| $C_2H_4$ | 10 |

In all the above examples, the mercury vapor remains unchanged therefore has not been included in the analysis.

The invention claimed is:

1. In a shock wave reaction for the dissociation of water wherein water vapor is subjected to one or more mechanical shock waves produced by a driving gas having an initial pressure in the range of 5 to 50 atmospheres, the improvement which comprises adding mercury vapor as a diluent to the water vapor wherein the volume ratio of water vapor to mercury vapor is in the range of 1:2 to 1:200, and separating the mercury from the product gas.

2. The process according to claim 1, wherein said water vapor and mercury vapor have an initial temperature on the order of 600°C. and an initial pressure on the order of 75 psia.

3. The process according to claim 1 in which the driving gas is hydrogen.

* * * * *